United States Patent
Zeng et al.

(10) Patent No.: US 12,263,850 B2
(45) Date of Patent: Apr. 1, 2025

(54) RADAR SIGNAL PROCESSING METHOD FOR IMPROVED OCCUPANT VITAL MONITORING

(71) Applicant: GM Global Technology Operations LLC, Detroit, MI (US)

(72) Inventors: Shuqing Zeng, Sterling Heights, MI (US); Praneeth Nelapati, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 322 days.

(21) Appl. No.: 18/154,101

(22) Filed: Jan. 13, 2023

(65) Prior Publication Data
US 2024/0239351 A1 Jul. 18, 2024

(51) Int. Cl.
*B60W 40/09* (2012.01)
*B60W 40/08* (2012.01)
*B60W 50/14* (2020.01)

(52) U.S. Cl.
CPC ............ *B60W 40/09* (2013.01); *B60W 50/14* (2013.01); *B60W 2040/0872* (2013.01); *B60W 2050/143* (2013.01); *B60W 2420/408* (2024.01)

(58) Field of Classification Search
CPC ................. B60W 40/09; B60W 50/14; B60W 2040/0872; B60W 2050/143; B60W 2420/408; B60W 2554/4046; B60W 40/08; B60W 2554/4029; B60W 2756/10; G01S 13/584; G01S 13/89; G01S 13/343; G01S 13/44; G01S 7/415; G08B 21/06; G08B 25/016; G06F 18/10; G06F 2218/02; G06F 2218/04; A61B 5/0205; A61B 5/024; A61B 5/05; A61B 5/0816; A61B 5/6893; A61B 5/7203; A61B 5/7235; A61B 5/725; A61B 5/7257; A61B 5/746; A61B 2503/22
See application file for complete search history.

(56) References Cited

U.S. PATENT DOCUMENTS

2022/0035017 A1* 2/2022 Ette .................. G01S 13/42

* cited by examiner

Primary Examiner — Nabil H Syed
Assistant Examiner — Cal J Eustaquio
(74) Attorney, Agent, or Firm — Vivacqua Crane, PLLC

(57) ABSTRACT

A radar signal processing method for improved occupant vital monitoring includes a method for detecting vital signs using at least one radar sensor mounted to a vehicle. The method includes detecting a plurality of target candidates using the at least one radar sensor, analyzing the plurality of target candidates to generate a list of targets, steering the at least one radar sensor towards the target using the angle of arrival to the target, and detecting a vital signal of the target based on the range using the at least one radar sensor.

16 Claims, 5 Drawing Sheets

RADAR SIGNAL PROCESSING METHOD FOR IMPROVED OCCUPANT VITAL MONITORING

INTRODUCTION

The present disclosure relates to a method for processing radar signals to detect doppler signatures and detect occupant vitals.

Occupant vital monitoring involves implementing at least one in-vehicle sensor to monitor occupant vitals in order to determine the status of the occupant. Monitoring occupant vitals allows for the vehicle to adjust vehicle settings or notify emergency services in the case a negative change in vitals. In the past, occupant vital monitoring has been achieved by implanting multiple electrodes or mmWave radars in a seat or steering wheel or mounting a plurality of infrared-cameras in a vehicle cabin directed towards an occupant. Therefore, current systems require multiple sensors and are only able to monitor a singular occupant of the vehicle. Current systems also cannot be used to detect and classify objects external to the vehicle.

Thus, while other methods achieve their intended purpose of monitoring occupant vitals, there is a need for a new and improved method which is able to monitor multiple occupants or pedestrians in a crowded environment external to the vehicle.

SUMMARY

According to several aspects, a method for detecting vital signs using at least one radar sensor mounted to a vehicle is provided. The method includes detecting a plurality of target candidates using the at least one radar sensor, analyzing the plurality of target candidates to generate a list of targets, steering the at least one radar sensor towards the target using the angle of arrival to the target, and detecting a vital signal of the target based on the range using the at least one radar sensor.

In an additional aspect of the present disclosure, the method further includes emitting and receiving a series of chirps throughout the vehicle using the at least one radar sensor, converting the series of chirps into a wave form, and identifying a plurality of energy peaks within the wave form.

In an additional aspect of the present disclosure, the method further includes generating a received signal spectral image by passing the plurality of energy peaks through a 2D-FFT filter and generating a target candidate signal spectral image by subtracting a background signal spectral image from the received signal spectral image.

In an additional aspect of the present disclosure, the method further includes using the target candidate signal spectral image to calculate the range, the angle of arrival, and a signal to interference and noise ratio of a target candidate represented in the target candidate signal spectral image. Moreover, the method includes using the angle of arrival, the range, the signal to interference and noise ratio of the target candidate to calculate a confidence level for the target candidate. The confidence level is a value that represents likelihood that the target candidate is an occupant. Additionally, the method includes determining whether the confidence level exceeds a predetermined threshold. The predetermined threshold must be exceeded in order for the target candidate to be added to the list of targets. Moreover, the method includes disqualifying the target candidate from the list of targets if the confidence level is below the predetermined threshold. Additionally, the method includes adding the target candidate to the list of targets if the confidence level is at or above the predetermined threshold.

In an additional aspect of the present disclosure the method further includes determining whether each of the target candidates represented in the target candidate signal spectral image is an occupant.

In an additional aspect of the present disclosure, the method further includes using the target candidate signal spectral image to calculate the range, the angle of arrival, and the signal to interference and noise ratio for the target. The range includes a distance from the target to the at least one radar sensor. The angle of arrival includes an angle of the target relative to the at least one radar sensor. The signal to interference and noise ratio includes an intensity of a target signal included in the target candidate signal spectral image relative to an interference and noise of the target signal.

In an additional aspect of the present disclosure, the method further includes analyzing the list of targets to compute a steering vector weight for each of the targets on the list of targets using the angle of arrival, the range of the target, and the signal to interference and noise ratio from the target to the at least one radar sensor. Additionally, the method includes using the steering vector weight to calculate a steering vector. The steering vector includes an optimal angle for the at least one radar sensor to point towards a target to minimize the signal to interference and noise ratio. Moreover, the method includes steering the at least one radar sensor towards the target using the steering vector.

In an additional aspect of the present disclosure, the method further includes using an algorithm to analyze the steering vector and the range to calculate the vital signal of the target. The vital signal of the target includes a heartbeat and a breath rate of the target.

In an additional aspect of the present disclosure, the method further includes analyzing the heartbeat and the respiratory breath rate for each target on the list of targets.

In an additional aspect of the present disclosure, the method further includes comparing the vital signal of the target to an upper and lower vital threshold and when the vital signal of the target is outside the upper and lower vital threshold, perform an action.

In an additional aspect of the present disclosure, the method further includes selecting an action from a group consisting of: performing a target health assessment, monitoring target motions to perform pattern recognition to alert a safety system of erratic driving behavior, contacting emergency services, detecting target status before and after a driving incident, and enacting anti-theft measures.

According to several aspects, a system for detecting vital signs using at least one radar sensor mounted to a vehicle is provided. The system includes at least one radar sensor. The at least one sensor is used to acquire information about an interior of the vehicle. Additionally, the system includes a controller in electrical communication with the at the least one radar sensor. The controller is programed to detect a plurality of target candidates using the at least one radar sensor. Moreover, the controller is programmed to analyze the plurality of target candidates to generate a list of targets. The list of targets includes a target. The target is at a range and an angle of arrival relative to the at least one radar sensor. Additionally, the controller is programmed to steer the at least one radar sensor towards the target using the angle of arrival to the target. Moreover, the controller is programmed to detect a vital signal of the target based on the range using the at least one radar sensor.

In an additional aspect of the present disclosure, the controller is further programmed to emit and receive a series of chirps throughout the vehicle using the at least one radar sensor. Additionally, the controller is programmed to convert the series of chirps into a wave form. Moreover, the controller is programmed to identify a plurality of energy peaks within the wave form. The plurality of energy peaks includes the plurality target candidates in wave form. The plurality of target candidates includes potential occupants. Additionally, the controller is programmed to generate a received signal spectral image by passing the plurality of energy peaks through a 2D-FFT filter. Moreover, the controller is programmed to generate a target candidate signal spectral image by subtracting a background signal spectral image from the received signal spectral image. The background signal spectral image is a pre-generated spectral image of an ambient state vehicle. The ambient state vehicle is an empty vehicle.

In an additional aspect of the present disclosure, the controller is further programmed to use the target candidate signal spectral image to calculate the range, the angle of arrival, and a signal to interference and noise ratio of a target candidate represented in the target candidate signal spectral image. Additionally, the controller is programmed to use the angle of arrival, the range, the signal to interference and noise ratio of the target candidate to calculate a confidence level for the target candidate. The confidence level is a value that represents likelihood that the target candidate is an occupant. Moreover, the controller is programmed to determine whether the confidence level exceeds a predetermined threshold. The predetermined threshold must be exceeded in order for the target candidate to be added to the list of targets. Additionally, the controller is programmed to disqualify the target candidate from the list of targets if the confidence level is below the predetermined threshold. Moreover, the controller is programmed to add the target candidate to the list of targets if the confidence level is at or above the predetermined threshold.

In an additional aspect of the present disclosure, the background signal spectral image is a pre-generated spectral image of an ambient state vehicle. The ambient state vehicle is a vehicle with no occupants. The controller is further programmed to determine whether each of the target candidates represented in the target candidate signal spectral image is an occupant.

In an additional aspect of the present disclosure, the background signal spectral image is a pre-generated spectral image of an ambient state vehicle. The ambient state vehicle is a vehicle with no occupants. The controller is further programmed to use the target candidate signal spectral image to calculate the range, the angle of arrival, and the signal to interference and noise ratio for the target. The range includes a distance from the target to the at least one radar sensor. The angle of arrival includes an angle of the target relative to the at least one radar sensor. The signal to interference and noise ratio includes an intensity of a target signal included in the target candidate signal spectral image relative to an interference and noise of the target signal.

In an additional aspect of the present disclosure, the controller is further programmed to analyze the list of targets to compute a steering vector weight for each of the targets on the list of targets using the angle of arrival, the range of the target, and the signal to interference and noise ratio from the target to the at least one radar sensor. Additionally, the controller is programmed to use the steering vector weight for each of the targets to calculate a steering vector. The steering vector includes an optimal angle for the at least one radar sensor to point towards a target to minimize the signal to interference and noise ratio. Moreover, the controller is programmed to steer the at least one radar sensor towards the target using the steering vector.

In an additional aspect of the present disclosure, the controller is further programmed to use an algorithm to analyze the steering vector and the range to calculate the vital signal of the target. The vital signal of the target includes a heartbeat and a breath rate of the target.

In an additional aspect of the present disclosure, detecting a vital signal of the target based on the range includes using the at least one radar sensor to analyze the heartbeat and the breath rate of the target.

In an additional aspect of the present disclosure, the controller is further programmed to perform a target health assessment, detect targets located outside the vehicle, monitor target motions to perform pattern recognition to alert a safety system of erratic driving behavior, detect target status before and after a driving incident, and enact anti-theft measures.

According to several aspects, a computer for an occupant vital monitoring system of a vehicle is provided. The system monitors a heartrate and breath rate of an occupant. The system includes an at least one radar sensor for acquiring information about an interior of the vehicle or an environment surrounding the vehicle. The system further includes a vehicle transceiver for communicating with an external network. The system further includes a controller in electrical communication with the at least one sensor and the vehicle transceiver, detecting occupant vitals. The controller includes at least one processor electrically communicating with the at least one radar sensor and the vehicle transceiver. Additionally, the controller includes a non-transitory computer readable storage medium for storing instructions. The at least one processor is programmed to detect a plurality of target candidates using the at least one radar sensor. Moreover, the controller is programmed to analyze the plurality of target candidates to generate a list of targets. The list of targets includes a target. The target is at a range and an angle of arrival relative to the at least one radar sensor. Additionally, the controller is programmed to steer the at least one radar sensor towards the target using the angle of arrival to the target. Moreover, the controller is programmed detect a vital signal of the target based on the range using the at least one radar sensor. Additionally, the controller is programmed to send a signal using the vehicle transceiver to the external network related to the detected vital signal of the target.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
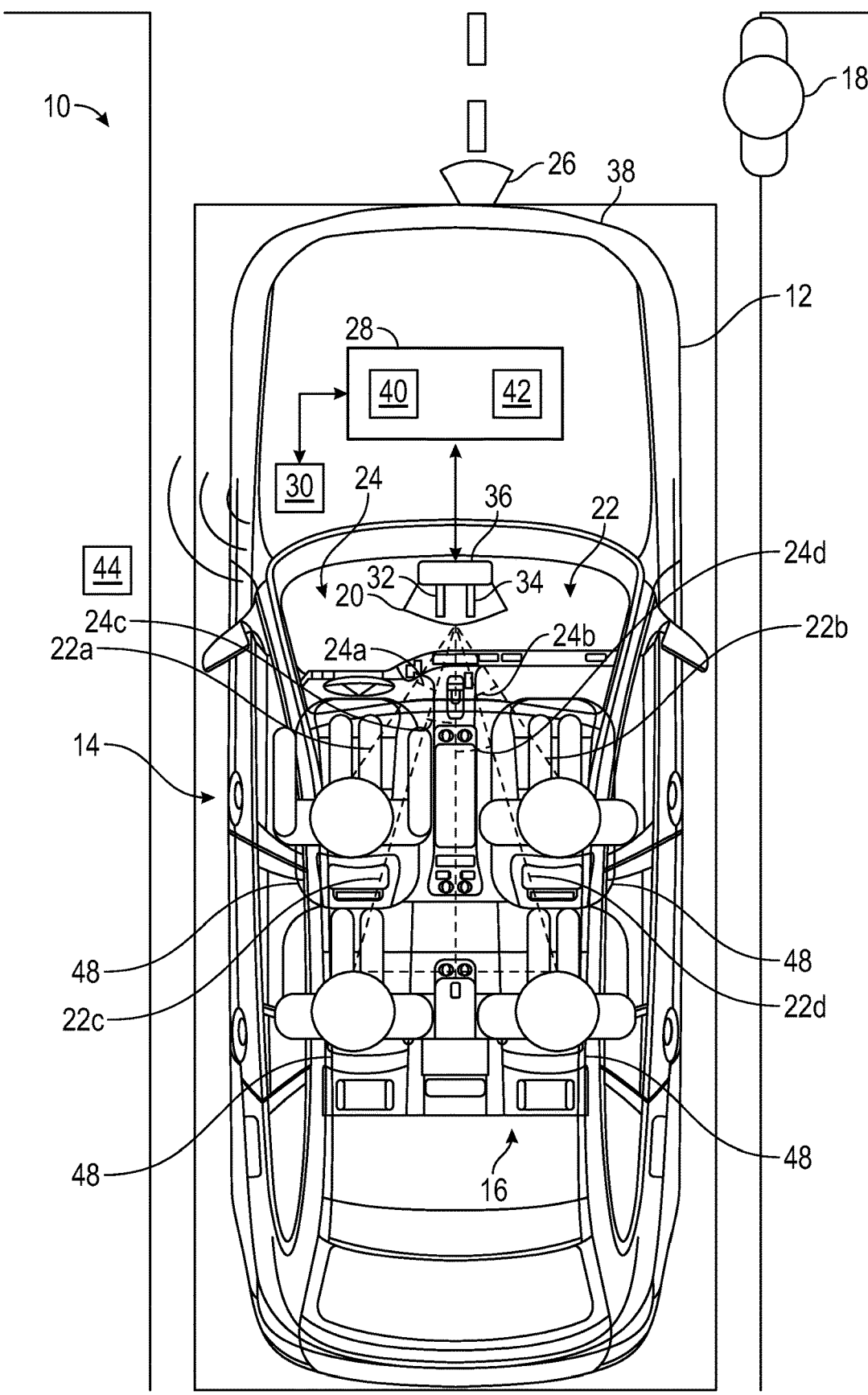
FIG. 1 is a schematic diagram of a vehicle according to an exemplary embodiment.

Referring to FIG. 1, a schematic diagram of a system for monitoring occupant vitals 10 in an exemplary vehicle 12 is illustrated. The system 10 is configured to detect vital signs of one or more targets 14 seated in the interior 16 of the vehicle 12, as well as one or more targets 14 located outside the vehicle 12. In the example provided the one or more targets are occupants of the vehicle 12. In the example provided the one or more targets 14 includes a first target 14a, a second target 14b, a third target 14c, and a fourth or final target 14d. It should also be appreciated that the vehicle can include n number of targets depending on the size and capacity of the interior 16 of the vehicle 12. Likewise, there may be n targets external to the vehicle 12 including a pedestrian 18. Each target is disposed relative to an interior radar sensor 20 at a range 22 and an angle of arrival (AoA) 24. The range 22 is a distance measured from a central point of the interior radar sensor 20. Therefore, the first target 14a is a range 22a of $R_1$ from the interior radar senor 20, the second target 14b is a range 22b of $R_2$ from the interior radar senor 20, the third target 14c is a range 22c of $R_3$ from the interior radar senor 20, and the fourth or final target 14d is a range 22d of $R_4$ from the interior radar senor 20. Likewise, the first target 14a is at an angle of arrival 24a of $\theta_1$ from the interior radar sensor 20, the second target 14b is at an angle of arrival of $\theta_2$ from the interior radar sensor 20, the third target 14c is at an angle of arrival of 24c of $\theta_3$ from the interior radar sensor 20, and the fourth or final target 14d is at an angle of arrival 24d of $\theta_4$ from the interior radar sensor 20. It should also be appreciated that vehicle 12 may be any type of vehicle having an occupant compartment including seating for a driver of the vehicle and one or more passengers or may be an autonomous or self-driving vehicle having no driver per se, in accordance with the scope of the present disclosure. The system 10 generally includes an interior radar sensor 20, an exterior radar sensor 26, a controller 28, and a vehicle transceiver 30.

The radar sensors 20, 26 are a Multiple-Input, Multiple-Output (MIMO) radar system. The MIMO radar system provides high-resolution radar measurements using multiple emitting and receiving antennae. An example of a MIMO radar system for use with the present invention is a Texas Instrument (TI) AWR1642 evaluation board. Accordingly, the radar sensors 20, 26 include a plurality of emitting antennae 32 housed internally within the radar sensors 20, 26 configured to emit a frequency modulated continuous wave (FMCW) Compressed High Intensity Radar Pulse (CHIRP) signal. An FMCW radar is a type of radar system that transmits a continuous wave (CW) signal that is frequency modulated over a certain range of frequencies. The transmitted signal is reflected back by objects in the environment, and the radar sensor receiver measures the frequency shift of the reflected signal to determine the range, velocity, and other characteristics of the objects. FMCW signal can be used in a MIMO system, where multiple FMCW signals are transmitted and received by the multiple antennas of the MIMO radar sensor. The use of FMCW signals and MIMO technology allows the MIMO radar sensor to achieve high resolution and accuracy in its measurements. The radar sensors 20, 26 also include a plurality of receiving antennae 34 housed internally within the radar sensors 20, 26 to receive the FMCW CHIRP signals. The radar sensors 20, 26 process the received FMCW CHIRP signals to determine the range, velocity, and/or other characteristics of a target. The radar sensors 20, 26 may use various signal processing techniques, such as beamforming, to enhance the accuracy and resolution of measurements of the characteristics of the one or more targets 14. In the present embodiment the interior radar sensor 20 is housed within the interior 16 of the vehicle 12 preferably in a rear-view mirror 36. The exterior radar sensor 26 is housed outside the vehicle 12 in a front portion 38 of the vehicle 12. Operation of the radar sensors 20, 26 will be described in greater detail below.

The controller 28 is in electrical communication with the radar sensors 20, 26 and the vehicle transceiver 30. Accordingly, the controller 28 receives information or data from the radar sensors 20, 26 and monitors the vital signal of the one or more targets 14. The controller 28 includes at least one processor 40 and a non-transitory computer readable storage device or media 42. The processor 40 may be a custom made or commercially available processor, a central processing unit (CPU), a graphics processing unit (GPU), an auxiliary processor among several processors associated with the controller 28, a semiconductor-based microprocessor (in the form of a microchip or chip set), a macroprocessor, a combination thereof, or generally a device for executing instructions. The computer readable storage device or media 42 may include volatile and nonvolatile storage in read-only memory (ROM), random-access memory (RAM), and keep-alive memory (KAM), for example. KAM is a persistent or non-volatile memory that may be used to store various operating variables while the processor 40 is powered down. The computer-readable storage device or media 42 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 28 to control the radar sensors 20, 26 and the vehicle transceiver 30. The controller 28 may also consist of multiple controllers which are in electrical communication with each other and, for example, include dedicated system controllers that individually and independently and at the direction of controller 28 control the operation of the radar sensors 20, 26 and the vehicle transceiver 30. It should be understood that various additional wired and wireless techniques and communication protocols for communicating with the controller 28 are within the scope of the present disclosure.

The controller 28 is also in electrical communication with one or more vehicle transceivers 30. The controller 28 communicates information or data to the vehicle transceiver 30 which is in communication with a vehicle communication network 44. The vehicle transceiver 30 alerts the vehicle communication network 44 when the system 10 has determined that the one or more targets 14 needs assistance or that the system 10 should act. The vehicle communication network includes a connection to emergency services such as onboard passenger health networks (i.e., OnStar) or local health services (i.e., 911). The method of communication for the one or more vehicle transceivers 30 may include, but are not limited to, cellular networks, dedicated short-range communications (DSRC) networks, or vehicle-to-infrastructure (V2X) wireless networks communications. Exemplary communications include cellular, Bluetooth®, IEEE 802.11, dedicated short-range communications (DSRC), and/or wide area networks (WAN), including the Internet, providing data communication services.

Figure 2:
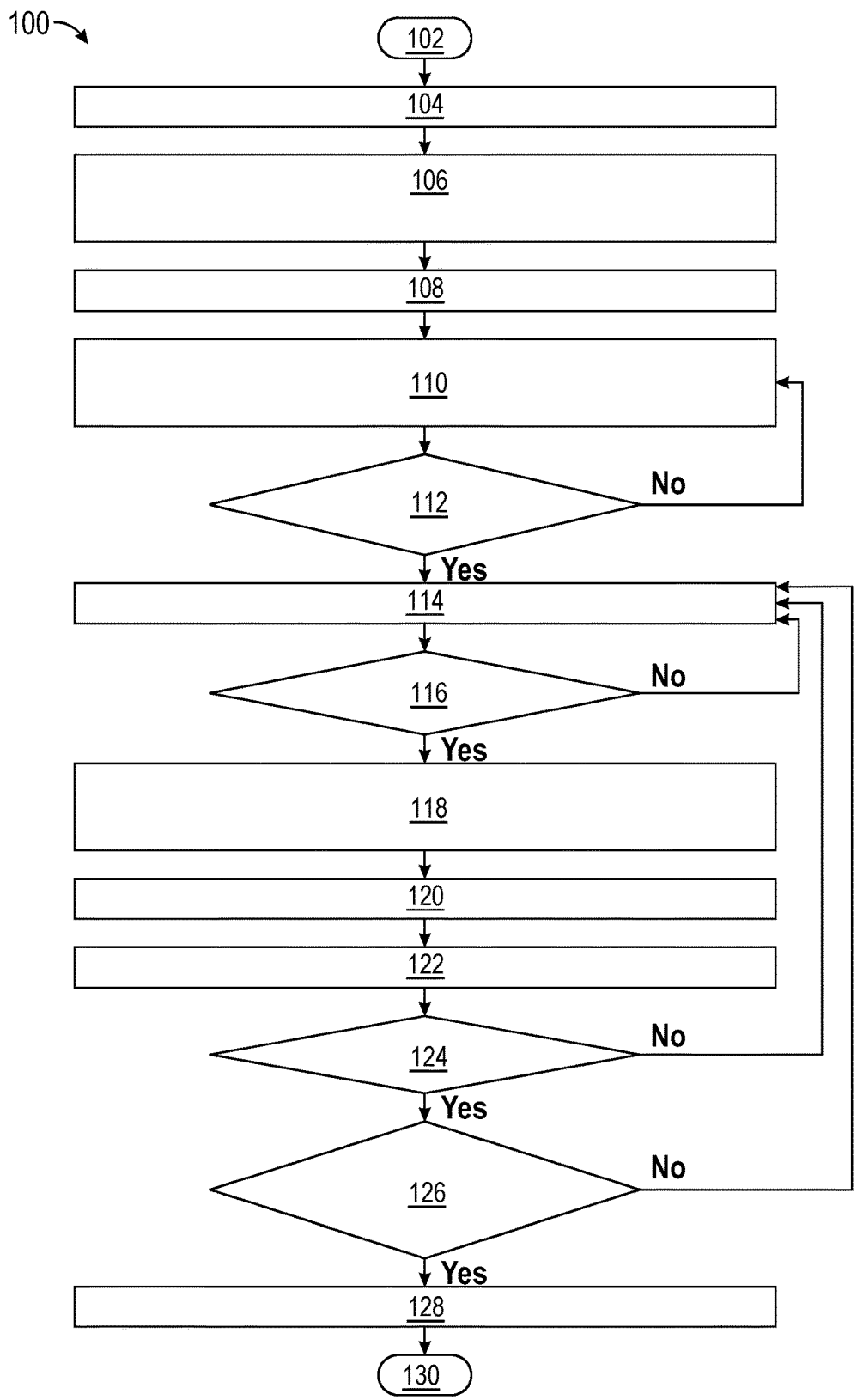
FIG. 2 is a block diagram illustrating the system logic for detecting targets and target vitals according to an exemplary embodiment.

Referring to FIG. 2 and continued reference to FIG. 1, a method for monitoring occupant vitals 100 using the system 10 is illustrated as a block diagram. The method 100 is used to determine occupant vitals, such as heartbeat and breath rate, of the occupants or plurality of targets 14 using the radar sensors 20, 26. The method 100 is also used to determine whether to take an action, such as alerting emergency services using the vehicle transceiver 30, if the occupant vitals indicate the need for the action described in greater detail below. Occupant or target vitals include heartbeat and breath rate. The method 100 also includes several subroutines, including a background suppression subroutine 200, a target separation subroutine 300, and a vital sinusoidal signal detection subroutine 400. The example provided will discuss the method 100 used to extract target vitals for a plurality of targets 14 within the interior 16 of the vehicle, however, it should be appreciated that the method 100 or a variation of the method 100 may also be applied to the pedestrians 18 outside the vehicle 12.

The method 100 begins at block 102, the method 100 then proceeds to block 104. At block 104, the radar sensors 20, 26 emit and receive a series of FMCW CHIRP signals. The radar sensors 20, 26 emit the series of FMCW CHIRP signals in order to detect a target candidate and generate a waveform. The target candidate is an object located in the vehicle 12 that has not yet been differentiated as either an occupant (i.e., a driver or passenger) or a non-occupant (i.e., cargo or an inanimate object). The FMCW CHIRP signal is received by the plurality receiving antennae 34 and is used to create a received signal matrix. The received signal matrix contains data from the FMCW CHIRP signal including a time the FMCW CHIRP signal was received by the plurality of receiving antennae 34, and the frequency at which the FMCW CHIRP signal was received by the plurality of receiving antennae 34. The received signal matrix contains the time and frequency of each FMCW CHIRP signal received by each of the plurality of receiving antenna 34. Once the received signal matrix has been created, the controller 28 translates the received signal matrix into a waveform. To translate the FMCW CHIRP signal to a waveform the controller 28 uses the following equation:

$$s_{IF}(n, m, l) = A\exp\left(j\left(2\pi f_b nT_s + \frac{4\pi(R(mT_c) + R_0)}{\lambda} + \frac{2\pi d\sin\theta}{\lambda}l\right)\right) \quad (1)$$

where $s_{IF}$ represents the resulting waveform, n represents the index of data sample within an FMCW CHIRP signal, m represents an individual FMCW CHIRP signal, l represents the index of the antenna that received the signals, A represents an amplitude of the waveform, $j=\sqrt{-1}$ represents the unit of imagine number, $f_b$ represents a beat frequency, $T_s$ represents a sampling time, R represents a cyclic motion displacement of the body, $T_c$ represents the time duration of each FMCW CHIRP signal, $R_0$ represents a range of the FMCW CHIRP signal to the target candidate, d represents the distance between the emitting antennae and the receiving antenna 34, θ represents the angle of arrival 24 of the between the FMCW CHIRP signal and the plurality of receiving antenna 34, and λ represents the wavelength of the FMCW CHIRP frequency. The beat frequency is calculated by the following formula:

$$f_b = \frac{2BR_0}{cT_c} \quad (2)$$

where B represents a bandwidth of the FMCW CHIRP signal. The waveform displays the time the FMCW CHIRP signal was received by the plurality of receiving antenna 34 on an x-axis and a frequency of the FMCW CHIRPS signal on a y-axis with multiple waves on the wave form, each wave representing the data received by each of the plurality of receiving antenna 34. The waveform may also include at least one peak. A peak in the waveform represents the target candidate. The method 100 then proceeds to block 106.

At block 106, the controller 28 passes the waveform through a Two-Dimensional Fast Fourier Transform (2D-FFT) filter to create a spectral image and the controller 28 executes the background suppression subroutine 200 shown in FIG. 3 which will be described in greater detail below. The 2D-FFT filter is a mathematical tool used to perform a 2D-FFTs on a digital image. The FFT is an algorithm that is used to decompose a signal or image into its individual frequency components. The 2D-FFT filter applies the FFT algorithm to a two-dimensional image, in this case the waveform, resulting in a received spectral image that represents the frequency content of the image, in this case the $S_{IF}$. The received spectral image Sip displays the angle of arrival of the FMCW CHIRP signal to the plurality of receiving antenna 34 on the x-axis, the range of the FMCW CHIRP signal to the target candidate on the y-axis, and the intensity of the CHIRP signal on the image itself using darker colors to represent more intense signals. The received spectral image $S_{IF}$ displays all of the target candidates identified by the radar sensors 20, 26. Additionally the controller 28 also executes the background suppression subroutine 200. The background suppression subroutine 200 filters background noise of the interior 16 of the vehicle 12 from the received spectral image $S_{IF}$ resulting in a target candidate spectral image. As a result, the target candidate spectral image is generated. The target candidate spectral image displays only the target candidates and allows the controller 28 to analyze the target candidates more accurately. The method 100 then proceeds to block 108.

Returning to FIG. 2, at block 108, the controller 28 detects the target candidates in the target candidate spectral image. The controller 28 detects target candidates in the target candidate spectral image by detecting a high intensity zone in the target candidate spectral image. A high intensity zone in the target candidate spectral image is a zone which the controller 28 determines that the intensity of the image and the size of the image exceeds thresholds indicative of a potential occupant. The method 100 then proceeds to block 110.

At block 110, the controller 28 computes the range 22, the angle of arrival (AoA) 24, and a signal interference to noise ratio (SINR) for each of the target candidates. As noted above, the range 22 is a distance from the radar sensor 20, 26 to the target candidate, the angle of arrival 24 is the angle at which the FMCW CHIRP signal returns to the plurality of receiving antenna 34, and the SINR is the strength of the target candidate signal compared to interference and noise.

Additionally, the controller 28 computes a confidence level for each of the target candidates using the range 22, AoA 24 and SINR of the target. The confidence level is a constant that represents the probability that the target candidate is an occupant as opposed to a non-occupant. The higher the confidence level, the more likely the target candidate is an occupant. The method 100 then proceeds to block 112.

At block 112, the controller 28 determines whether the target candidate analyzed was the final target candidate to be analyzed. If the controller 28 determines that the target candidate analyzed was the final target candidate to be analyzed, then the method 100 proceeds to block 114. If the controller 28 determines that the target candidate was not the final target candidate to be analyzed, then the method 100 returns to block 110 where the controller 28 will analyze the next target candidate on the target candidate spectral image.

At block 114, the controller 28 generates a list of target candidates. The list of target candidates includes one or more target candidates, each corresponding to an object or occupant 14 detected in the interior 16 vehicle 12. The list of target candidates includes the target candidate, the range 22, the (AoA) 24, the SINR of the target candidate, and the confidence level of the target candidate. The method 100 then proceeds to block 116.

At block 116, the controller 28 determines whether the confidence level of the target candidate exceeds a predetermined confidence threshold. The predetermined confidence threshold is a value that if exceeded identifies the target candidate as a target (i.e., an occupant to be monitored). If the controller 28 determines that the confidence level for the target candidate meets or exceeds the confidence threshold, then the controller 28 determines that the target candidate is a target and the method 100 proceeds to block 118. If the controller 28 determines that the confidence level for the target candidate falls below the confidence threshold, then the controller 28 determines that target candidate is not a target (i.e., not an occupant) and disqualifies the target candidate from the list of target candidates to prevent further computation; the method 100 returns to block 114 where the method 100 will continue to compare the target candidates on the list of target candidates to the confidence threshold to determine which of the target candidates are occupants and which of the target candidates are not occupants. In the example provided in FIG. 1, there are four occupants 14 and therefore four targets including a first target 14a, a second target 14b, a third target 14c, and a fourth or final target 14d. It should be appreciated that the method 100 can identify any number of targets.

Figure 4:
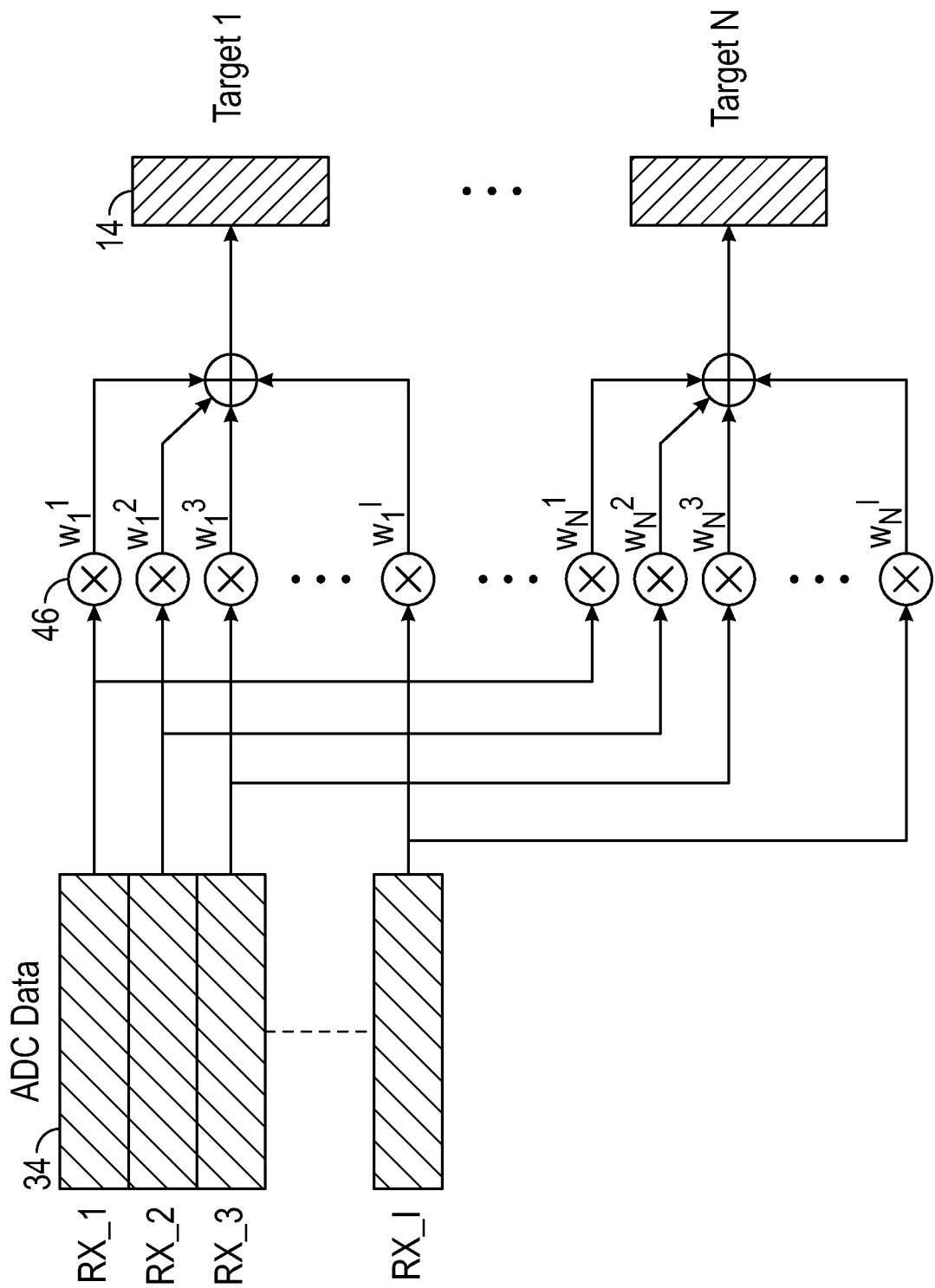
FIG. 4 is a schematic diagram that illustrates an optimal beam steering system according to an exemplary embodiment.

At block 118, the controller 28 computes an optimal beam steering vector $w_n$ for the first target 14a. The optimal beam steering vector $w_n$ is the angle at which the radar sensor 20, 26 should point while monitoring the target to encounter the lowest SINR in order to receive the most accurate vital signal. Turning to FIG. 4, an exemplary method for computing an optimal beam steering vector $w_n$ is shown in a schematic diagram. The schematic diagram features the plurality of receiving antennae 34, a plurality of beam steering weights 46, and a plurality of occupants 14. The plurality of receiving antennae 34 are located within the radar sensors 20, 26 and are separated at uniform distances apart d. The plurality of beam steering weights 46 is a plurality of constants that are used to represent how low the SINR of the FMCW CHIRP signal is to a receiver antenna. The lower the SINR of the FMCW CHIRP signal to a specific receiver antenna 24, the higher the weight of the specific receiver antenna 34. The plurality of beam steering weights 46 are implemented in the following formula to calculate the optimal beam steering vector $w_n$ for each of the plurality of targets 14:

$$w_n = [w_n^1, \ldots, w_n^L] \qquad (3)$$

where $w_n^l$ is the weight for the $n^{th}$, and $L^{th}$ receiving antennae element. For each target $n^{th}$, the controller 28 maximizes the vital signal to interference noise ratio (SINR) at the target's angle $\theta_n$. The plurality of beam steering weights 46 are derived from the plurality receiving antennae 34. To calculate the optimal beam steering vector $w_n$ the controller vectorizes the received spectral image $S_{IF}$. Afterwards, the controller 28 calculates $w_n$ such that the following formula's value is minimized:

$$P = E\{|w_k^H s_{IF}|^2\} = w_k^H S w_n \qquad (4)$$

where E represents expectation of a random variable, $$w_k^H c = f, c = \left[1, e^{j\frac{2\pi}{\lambda}d\sin\theta_k}, \ldots, e^{jL\frac{2\pi}{\lambda}d\sin\theta_k}\right],$$

f=[1, 0, . . . , 0], and $S=E\{S_{IF}{}^H S_{IF}\}$. The method 100 the proceeds to block 120.

Figure 5:
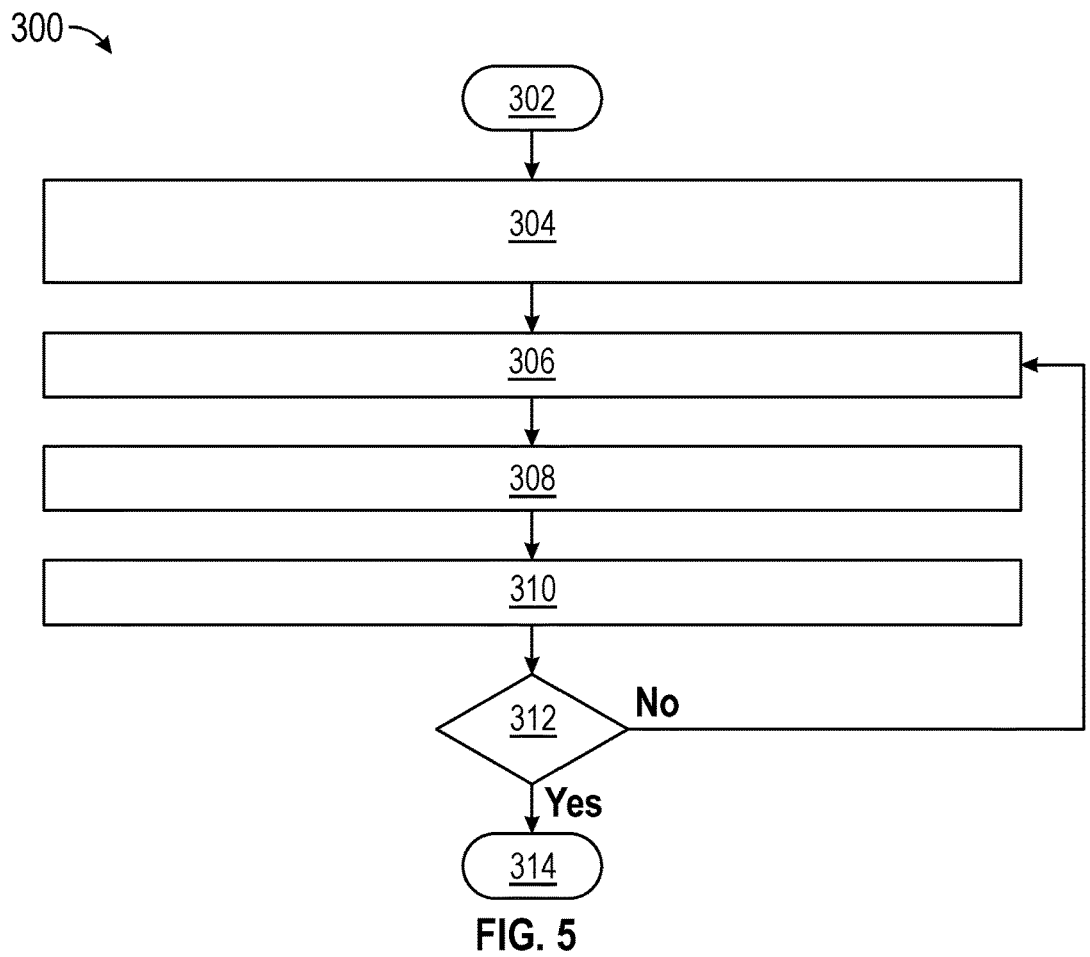
FIG. 5 is a block diagram that illustrates a target separation subroutine according to an exemplary embodiment.

Returning to FIG. 2, at block 120 the controller 28 executes the target separation subroutine 300 which is shown in FIG. 5 and described in greater detail below. The target separation subroutine 300 extracts a target doppler signature from a target signal. The target doppler signature includes a signal that is used to track the vital signal of the target to account for movement of the target. The target signal includes the FMCW CHIRP signal of the target, for example the first target 14a. The method 100 then proceeds to block 122.

Figure 6:
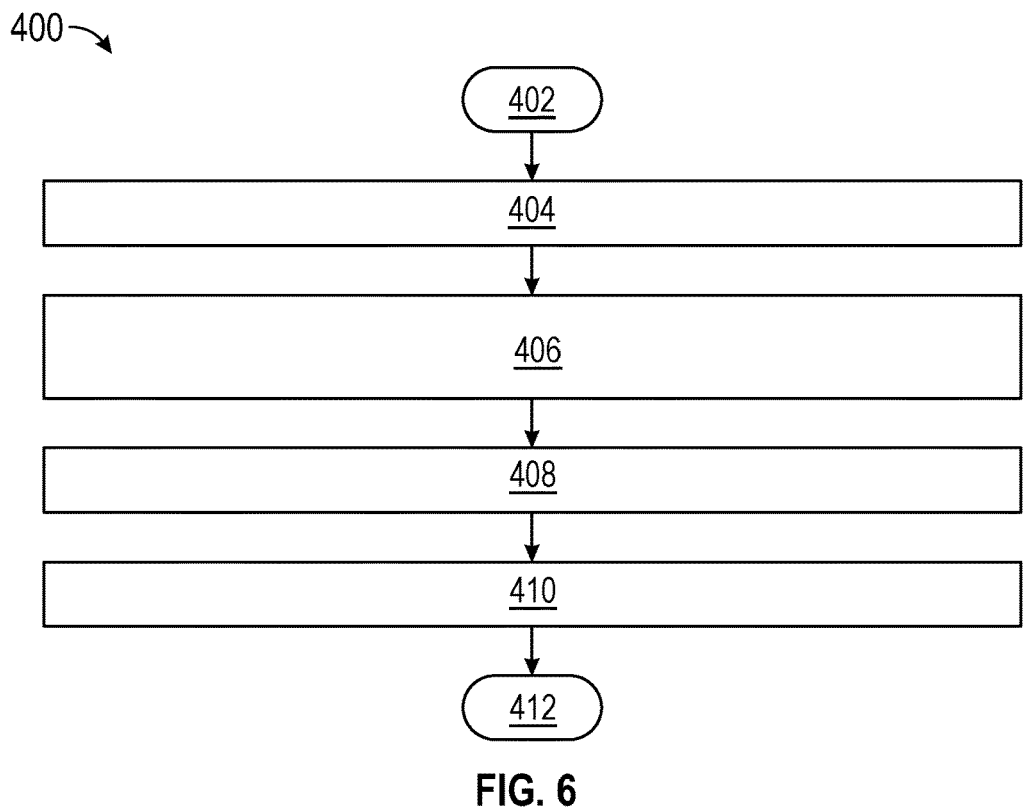
FIG. 6 is a block diagram that illustrates a vital sinusoidal signal detection subroutine according to an exemplary embodiment.

At block 122, the controller 28 executes a vital sinusoidal signal detection subroutine 400 which is shown in FIG. 6 and described in greater detail below. The vital sinusoidal signal detection subroutine 400 extracts the vital signal of the target from the target doppler signature. The vital signal of the target includes the heartbeat and breath rate of the target, for example the first target 14a. The method 100 then proceeds to block 124.

At block 124, the controller 28 determines whether the vital signal of the target extracted was the vital signal of a final target 14d. In other words, the method 100 determines if each of the first target 14a, the second target 14d, the third target 14c and the fourth target 14d through to n number of targets have had the vital signal extracted. The final target is the last target on the target candidate list (i.e., the $n^{th}$ target), in the present embodiment the fourth target 14d is the final target. If the controller 28 determines that the vital signal of the target was the vital signal of the final target candidate, then the method 100 proceeds to block 126. If the controller 28 determines that the vital signal of the target were the vitals signals of the target candidate, then the method 100 returns to block 114 where the controller 28 will analyze the next target candidate to determine whether the target candidate is a target, thus repeating until all n target candidates have been analyzed.

At block 126, the controller 28 determines whether the target heartbeat and breath rate require an action, for example, notifying an onboard passenger health network (i.e., OnStar) or local health services (i.e., 911). If the controller 28 determines that the target vitals indicate the need for assistance, then the method 100 proceeds to block 128. If the controller 28 determines that the target vitals do not indicate the need for assistance, then the method 100 returns to block 114, where the controller 28 will analyze the next target candidate to determine whether the target candidate is a target, thus repeating until all n target candidates have been analyzed.

At block 128, the controller 28 alerts the vehicle transceiver 30 to send a signal to the vehicle communication network 44 to send assistance to the target 14. The method 100 then concludes at block 130.

Figure 3:
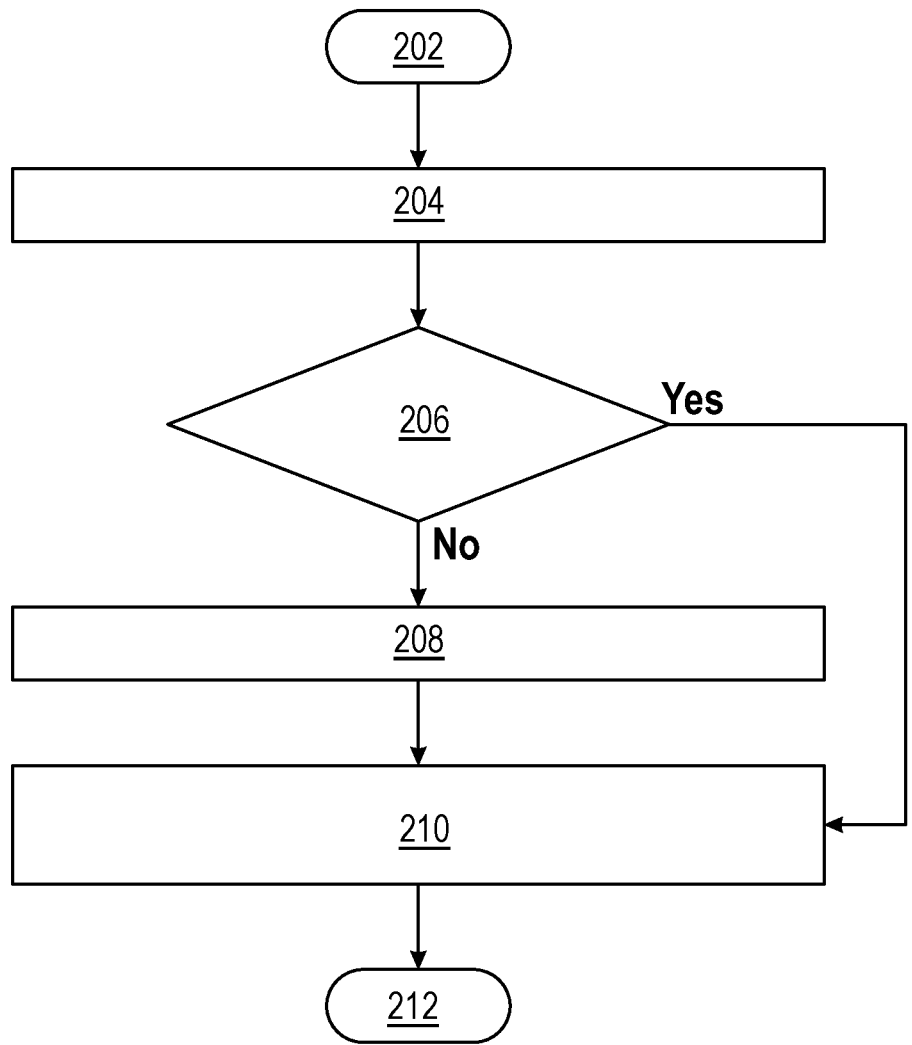
FIG. 3 is a block diagram that illustrates a background suppression subroutine according to an exemplary embodiment.

Turning now to FIG. 3, the subroutine for background suppression 200 is illustrated. The background suppression subroutine 200 occurs at block 106 of the method for monitoring occupant vitals 100. Generally, the background suppression subroutine 200 subtracts a background spectral image from the received spectrum image in order to create a target candidate spectrum image. The method 200 begins at block 202, then proceeds to block 204.

At block 204, the controller 28 generates a received signal spectral image. The received signal spectral image includes a spectral image of the interior 16 of the vehicle 12. The received spectral image $S_{IF}$ includes the plurality of occupants or targets 14 and non-occupants as well as the interior 16 of the vehicle 12. The interior 16 of the vehicle 12 includes the landscape of the interior 16 of the vehicle 12 (i.e., seats 48 or a center console). The method 200 then proceeds to block 206.

At block 206, the controller 28 determines whether a target candidate is detected in the received signal spectral image $S_{IF}$. If a target candidate is detected on the received spectral image $S_{IF}$, then the method 200 proceeds to block 210. If a target candidate is not detected in the received signal spectral image, then the method 200 proceeds to block 208.

At block 208, the controller 28 updates the background spectral image. The background spectral image includes the landscape of the interior 16 of the vehicle 12 (i.e., seats 48) but does not include occupants 14 and non-occupants. To update the background spectral image, the controller 28 replaces the received signal spectrum $S_{IF}$ image with an updated background spectral image of the interior 16 of the vehicle 12 taken most recently. The updated background spectral image is a more accurate filtered image, as it is the most recent spectrum image of the interior 16 of the vehicle 12. The method 200 then proceeds to block 210.

At block 210, the controller 28 subtracts the received signal spectral image $S_{IF}$ with the background spectral image or the updated background spectral image depending on the determination made at block 206. For example, the controller 28 removes any high intensity zones identified in the updated background spectral image from the received spectrum image $S_{IF}$ thereby leaving only intensity zones that represent target candidates. The resulting image is the target candidate spectrum image. The method 200 then ends and proceeds to block 108 in FIG. 2.

Turning now to FIG. 5, the target separation subroutine 300 is illustrated as a block diagram. Generally, the target separation subroutine 300 separates the vital signal of the target from the target signal. The method 300 begins at block 302, then proceeds to block 304.

At block 304, the controller 28 aggregates the signals from the receiving antennae 34. The controller 28 uses the following formula to aggregate the CHRIP signals:

$$s_{IF}(n, m) = w_k^H s_{IF}(n, m, :) \quad (5)$$

where $w_k$ represents the optimal steering vector for the target n, and H represents matrix transpose operation. The aggregation also uses the formula:

$$v(m)^{(2\pi f_b n T_s)} + \beta + \epsilon(n) \quad (6)$$

To represent the vital signal of the target, where v(m) represents the vital signal of the target, $\beta$ is the bias, and $\epsilon(n)$ is the Gaussian white noise in a complex domain. The method 300 then proceeds to block 306.

At block 306, the controller 28 computes vectors c and v, and matrix A. Vector c is calculated by the formula:

$$[1, \exp(2\pi f_b T_s), \ldots, \exp(2\pi f_b (N-1) T_s)]^T \quad (7)$$

where $T_s$ represents the sampling rate of the ADC process, vector b represents the measurement vector and is calculated by the formula:

$$b = [s_{IF}(0, m), \ldots, s_{IF}(N-1, m)]^T \quad (8)$$

where matrix A is represented by the formula:

$$A = [c, 1] \quad (9)$$

The method 300 then proceeds to block 308.

At block 308, the controller 28 uses a least-squares analysis to determine a solution vector that will be used to extract vital signals. A least-squares analysis is a statistical method for choosing unknown parameters in a linear regression model to more accurately calculate results. Here, the least-squares analysis calculates the solution vector represented by x using the formula:

$$x = (A^H A)^{-1} A^H b. \quad (10)$$

Where A=[c, 1] (1 is an all-one vector), x=[v(m),$\beta$]$^T$, and b=[$s_{IF}$(0, m), . . . , $s_{IF}$(N−1, m)]$^T$. The measurement signal is modeled as equation; and c=[1,exp($2\pi f_b T_s$), . . . , exp ($2\pi f_b$(N−1)$T_s$)]$^T$. The method 300 then proceeds to block 310.

At block 310, the controller 28 extracts and outputs v(m) from x[0], where v(m)=x and where x[0] represents DC component of the signal. The method 300 then proceeds to block 312.

At block 312, the controller 28 determines whether m is less than M (i.e., m>M), where m represents the index of the FMCW CHIRP and M represents the maximal number of chirps in each measurement cycle. If the controller 28 determines that m is less than M, then the method 300 proceeds to block 314 where the method 300 concludes and proceeds to block 122 in FIG. 2. If the controller 28 determines that m is not less than M, then the method 300 returns to block 306.

Turning now to FIG. 6, the vital sinusoidal signal detection subroutine 400 is illustrated as a block diagram. The vital sinusoidal signal detection subroutine 400 uses the vital signal v(m) generated in the target separation subroutine 300 to extract a heartbeat signal $s_{Hb}$ and a breath rate signal $s_{Br}$ of the target. The heartbeat signal is further analyzed to identify the heartbeat of the target, and the breath rate signal is further analyzed to detect the breath rate of the target. The vital sinusoidal signal detection subroutine 400 begins at block 402, then proceeds to block 404.

At block 404, the controller 28 uses a low-pass filter to suppress body movement from interfering with the vital signal of the target. The low-pass filter prevents a movement from the target from providing an inaccurate vital signal of the target. The movement of the target includes actions that may interfere with the radar sensor 20, 26 receiving an accurate vital signal (i.e., the occupant fidgets or adjusts in a seat 48). The method 400 then proceeds to block 406.

At block 406, the controller 28 separates peaks of the vital signal in the target candidate spectrum diagram. The peaks of the vital signal represent the breath rate signal and the heartbeat signal of the target. The peaks are separated using a least-squares analysis. The vital signal of the target is represented by v(m), which is modeled by the formula:

$$v(m) = s_{Br}(m) + s_{Hb}(m) + \beta + \varepsilon(m) \quad (11)$$

where $s_{Br}(m)$ represents the breath rate signal and is calculated with the formula:

$$s_{Br}(m) = A_{Br} \exp\left(\frac{4\pi}{\lambda} f_{Br} m T_c\right) \quad (12)$$

where $A_{Br}$ represents ... and where $s_{Hb}(m)$ is the heartbeat signal and is calculated by the formula:

$$s_{Hb}(m) = A_{Hb} \exp\left(\frac{4\pi}{\lambda} f_{Hb} m T_c\right) \quad (13)$$

where $A_{Hb}$ represents the amplitude of the waveform and where $\beta$ is a DC component invariant to m. The least-squares analysis is represented by the formula:

$$x = (A^H A)^{-1} A^H \quad (14)$$

where $A = [c_{Br}, c_{Hb}, 1]$, where $$c_{Br} = \left[1, \exp\left(\frac{4\pi}{\lambda} f_{Br} T_c\right),\right.$$

..., exp $$\left.\left(\frac{4\pi}{\lambda} f_{Br} M T_c\right)\right]^T,$$

where $$c_{Hb} = \left[1, \exp\left(\frac{4\pi}{\lambda} f_{Hb} T_c\right),\right.$$

..., $$\left.\left(\frac{4\pi}{\lambda} f_{Hb} M T_c\right)\right]^T,$$

and where 1 is an all-one where ... , exp vector. After the peaks are extracted, the method 400 then proceeds to block 408.

At block 408, the controller 28 extracts the heartbeat signal and the breath rate signal. To extract the breath rate of the target the controller 28 will apply the following formula:

$$s'_{Br}(m) = v(m) - x[1]\exp\left(\frac{4\pi}{\lambda} f_{Hb} m T_c\right) - x[2] \quad (15)$$

where $s'_{Br}(m)$ represents the breath rate, x[1] represents the second component of vector x, and x[2] represents the third component of vector x. To extract the heartbeat of the target the controller 28 will apply the following formula:

$$s'_{Hb}(m) = v(m) - x[0]\exp\left(\frac{4\pi}{\lambda} f_{Br} m T_c\right) - x[2] \quad (16)$$

where x[0] represents DC component. The method 400 then proceeds to block 410.

At block 410, the controller 28 re-estimates the frequency for the breath rate signal and the heartbeat signal. To re-estimate the breath rate signal, the controller 28 applies the following formula:

$$f_{max} = \mathrm{argmax}_f \left|\sum_{m=0}^{M} s'_{Br}(m)\exp^{(-2\pi f m)}\right| \quad (17)$$

To re-estimate the heartbeat signal, the controller 28 applies the following formula:

$$f_{max} = \mathrm{argmax}_f \left|\sum_{m=0}^{M} s'_{Hb}(m)\exp^{(-2\pi f m)}\right| \quad (18)$$

The method 400 then proceeds to block 412 where the method 400 and proceeds to block 124 in FIG. 2.

The radar signal processing method for improved occupant vital monitoring of the present disclosure offers several advantages. These includes the ability to monitor multiple occupants simultaneously, the ability to monitor and classify external objects, and the need to use less sensors and computational power.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for detecting vital signs using at least one radar sensor mounted to a vehicle, the method comprising:

detecting a plurality of target candidates using the at least one radar sensor; analyzing the plurality of target candidates to generate a list of targets, wherein the list of targets includes a target, wherein the target is at a range and an angle of arrival relative to the at least one radar sensor; steering the at least one radar sensor towards the target using the angle of arrival to the target; and detecting a vital signal of the target based on the range using the at least one radar sensor;

wherein detecting the plurality of target candidates comprises:

emitting and receiving a series of chirps throughout the vehicle using the at least one radar sensor;

converting the series of chirps into a wave form;

identifying a plurality of energy peaks within the wave form, wherein the plurality of energy peaks includes the plurality target candidates in wave form, wherein the plurality of target candidates includes potential occupants;

generating a received signal spectral image by passing the plurality of energy peaks through a 2D-FFT filter; and generating a target candidate signal spectral image by subtracting a background signal spectral image from the received signal spectral image, wherein the background signal spectral image is a pre-generated spectral image of an ambient state vehicle, wherein the ambient state vehicle is an empty vehicle;

wherein the method further includes:

analyzing the plurality of target candidates to generate the list of targets comprises:

using the target candidate signal spectral image to calculate the range, the angle of arrival, and a signal to interference and noise ratio of a target candidate represented in the target candidate signal spectral image;

using the angle of arrival, the range, the signal to interference and noise ratio of the target candidate to calculate a confidence level for the target candidate, wherein the confidence level is a value that represents likelihood that the target candidate is an occupant:

determining whether the confidence level exceeds a predetermined threshold, wherein the predetermined threshold must be exceeded in order for the target candidate to be added to the list of targets;

disqualifying the target candidate from the list of targets if the confidence level is below the predetermined threshold; and adding the target candidate to the list of targets if the confidence level is at or above the predetermined threshold.

2. The method of claim 1, further including:

analyzing the plurality of target candidates to generate the list of targets comprises determining whether each of the target candidates represented in the target candidate signal spectral image is an occupant.

3. The method of claim 1, wherein analyzing the plurality of target candidates to generate the list of targets comprises using the target candidate signal spectral image to calculate the range, the angle of arrival, and the signal to interference and noise ratio for the target, wherein the range includes a distance from the target to the at least one radar sensor, and wherein the angle of arrival includes an angle of the target relative to the at least one radar sensor, and wherein the signal to interference and noise ratio includes an intensity of a target signal included in the target candidate signal spectral image relative to an interference and noise of the target signal.

4. The method of claim 3, wherein steering the at least one radar sensor towards the target using the angle to the target comprises:

analyzing the list of targets to compute a steering vector weight for each of the targets on the list of targets using the angle of arrival, the range of the target, and the signal to interference and noise ratio from the target to the at least one radar sensor;

using the steering vector weight to calculate a steering vector, wherein the steering vector includes an optimal angle for the at least one radar sensor to point towards a target to minimize the signal to interference and noise ratio; and steering the at least one radar sensor towards the target using the steering vector.

5. The method of claim 4, wherein detecting the vital signal of the target based on the range using the at least one radar sensor comprises using an algorithm to analyze the steering vector and the range to calculate the vital signal of the target, wherein the vital signal of the target includes a heartbeat and a breath rate of the target.

6. The method of claim 5, wherein detecting a vital signal of the target based on the range using the at least one radar sensor comprises analyzing the heartbeat and the respiratory breath rate for each target on the list of targets.

7. The method of claim 5, further comprising comparing the vital signal of the target to an upper and lower vital threshold and when the vital signal of the target is outside the upper and lower vital threshold, perform an action.

8. The method of claim 7, wherein the action is selected from the group consisting of:

performing a target health assessment;

monitoring target motions to perform pattern recognition to alert a safety system of erratic driving behavior;

contacting emergency services;

detecting target status before and after a driving incident; and enacting anti-theft measures.

9. A system for detecting vital signs using at least one radar sensor mounted to a vehicle, the system comprising:

at least one radar sensor, wherein the at least one sensor is used to acquire information about an interior of the vehicle;

a controller in electrical communication with the at the least one radar sensor, wherein the controller is programed to:

detect a plurality of target candidates using the at least one radar sensor;

analyze the plurality of target candidates to generate a list of targets, wherein the list of targets includes a target, wherein the target is at a range and an angle of arrival relative to the at least one radar sensor; steer the at least one radar sensor towards the target using the angle of arrival to the target; and detect a vital signal of the target based on the range using the at least one radar sensor;

wherein to detect the plurality of target candidates comprises:

emit and receive a series of chirps throughout the vehicle using the at least one radar sensor;

convert the series of chirps into a wave form;

identify a plurality of energy peaks within the wave form, wherein the plurality of energy peaks includes the plurality target candidates in wave form, wherein the plurality of target candidates includes potential occupants;

generate a received signal spectral image by passing the plurality of energy peaks through a 2D-FFT filter; and
generate a target candidate signal spectral image by subtracting a background signal spectral image from the received signal spectral image, wherein the background signal spectral image is a pre-generated spectral image of an ambient state vehicle, wherein the ambient state vehicle is an empty vehicle;
wherein the system further includes:
analyze the plurality of target candidates to generate the list of targets comprises: using the target candidate signal spectral image to calculate the range, the angle of arrival, and a signal to interference and noise ratio of a target candidate represented in the target candidate signal spectral image; using the angle of arrival, the range, the signal to interference and noise ratio of the target candidate to calculate a confidence level for the target candidate, wherein the confidence level is a value that represents likelihood that the target candidate is an occupant;
determine whether the confidence level exceeds a predetermined threshold, wherein the predetermined threshold must be exceeded in order for the target candidate to be added to the list of targets; disqualify the target candidate from the list of targets if the confidence level is below the predetermined threshold; and
add the target candidate to the list of targets if the confidence level is at or above the predetermined threshold.

10. The system of claim 9, wherein the background signal spectral image is a pre-generated spectral image of an ambient state vehicle, wherein the ambient state vehicle is a vehicle with no occupants, and wherein the controller is further programmed to determine whether each of the target candidates represented in the target candidate signal spectral image is an occupant.

11. The system of claim 9, wherein the background signal spectral image is a pre-generated spectral image of an ambient state vehicle, wherein the ambient state vehicle is a vehicle with no occupants, and wherein the controller is further programmed to use the target candidate signal spectral image to calculate the range, the angle of arrival, and the signal to interference and noise ratio for the target, wherein the range includes a distance from the target to the at least one radar sensor, and wherein the angle of arrival includes an angle of the target relative to the at least one radar sensor, and wherein the signal to interference and noise ratio includes an intensity of a target signal included in the target candidate signal spectral image relative to an interference and noise of the target signal.

12. The system of claim 9, wherein the at least one controller programmed to steer the at least one radar sensor towards the target using the angle of arrival to the target is further programmed to:
analyze the list of targets to compute a steering vector weight for each of the targets on the list of targets using the angle of arrival, the range of the target, and the signal to interference and noise ratio from the target to the at least one radar sensor;
use the steering vector weight for each of the targets to calculate a steering vector, wherein the steering vector includes an optimal angle for the at least one radar sensor to point towards a target to minimize the signal to interference and noise ratio; and
steer the at least one radar sensor towards the target using the steering vector.

13. The system of claim 9, wherein the controller programmed to detect a vital signal of the target based on the range using the at least one radar sensor is further programmed to use an algorithm to analyze the steering vector and the range to calculate the vital signal of the target, wherein the vital signal of the target includes a heartbeat and a breath rate of the target.

14. The system of claim 9, wherein detecting a vital signal of the target based on the range includes using the at least one radar sensor to analyze the heartbeat and the breath rate of the target.

15. The system of claim 9, wherein the at least one controller programmed to detect a vital signal of the target based on the range using the at least one radar sensor is further programmed to:
perform a target health assessment;
detect targets located outside the vehicle;
monitor target motions to perform pattern recognition to alert a safety system of erratic driving behavior;
detect target status before and after a driving incident; and
enact anti-theft measures.

16. A computer for an occupant vital monitoring system of a vehicle, the system monitoring a heartrate and breath rate of an occupant, the system further including an at least one radar sensor for acquiring information about an interior of the vehicle or an environment surrounding the vehicle, the system further including a vehicle transceiver for communicating with an external network, the system further including a controller in electrical communication with the at least one sensor and the vehicle transceiver, detecting occupant vitals, the controller comprising:
at least one processor electrically communicating with the at least one radar sensor and the vehicle transceiver; and
a non-transitory computer readable storage medium storing instructions such that the at least one processor is programmed to:
detect a plurality of target candidates using the at least one radar sensor;
analyze the plurality of target candidates to generate a list of targets, wherein the list of targets includes a target, wherein the target is at a range and an angle of arrival relative to the at least one radar sensor;
steer the at least one radar sensor towards the target using the angle of arrival to the target;
detect a vital signal of the target based on the range using the at least one radar sensor; and send a signal using the vehicle transceiver to the external network related to the detected vital signal of the target;
wherein to detect the plurality of target candidates comprises:
emit and receive a series of chirps throughout the vehicle using the at least one radar sensor;
convert the series of chirps into a wave form;
identify a plurality of energy peaks within the wave form, wherein the plurality of energy peaks includes the plurality target candidates in wave form, wherein the plurality of target candidates includes potential occupants;
generate a received signal spectral image by passing the plurality of energy peaks through a 2D-FFT filter; and
generate a target candidate signal spectral image by subtracting a background signal spectral image from the received signal spectral image, wherein the background signal spectral image is a pre-generated spectral image of an ambient state vehicle, wherein the ambient state vehicle is an empty vehicle;

wherein the computer further includes:
analyze the plurality of target candidates to generate the list of targets comprises: using the target candidate signal spectral image to calculate the range, the angle of arrival, and a signal to interference and noise ratio of a target candidate represented in the target candidate signal spectral image; using the angle of arrival, the range, the signal to interference and noise ratio of the target candidate to calculate a confidence level for the target candidate, wherein the confidence level is a value that represents likelihood that the target candidate is an occupant;
determine whether the confidence level exceeds a predetermined threshold, wherein the predetermined threshold must be exceeded in order for the target candidate to be added to the list of targets; disqualify the target candidate from the list of targets if the confidence level is below the predetermined threshold; and
add the target candidate to the list of targets if the confidence level is at or above the predetermined threshold.

\* \* \* \* \*